(# United States Patent [19]

Corrado et al.

[11] 4,250,295
[45] Feb. 10, 1981

[54] UNSATURATED POLYESTER RESINS CONTAINING AN ADDITIVE OF THE FORMULA R—OH WHICH ARE NOT INHIBITED BY THE OXYGEN OF THE AIR AND PROCESS FOR MAKING THE SAME

[75] Inventors: Giovanni Corrado, Rome; Bruno Sopino, Colleferro, both of Italy

[73] Assignee: SNIA VISCOSA Societa Nazionale Industria Applicazioni Viscosa S.p.A., Milan, Italy

[21] Appl. No.: 58,203

[22] Filed: Jul. 17, 1979

[30] Foreign Application Priority Data

Jul. 26, 1978 [IT]  Italy ............... 26109 A/78

[51] Int. Cl.³ ........................................... C08F 222/04
[52] U.S. Cl. .............................. 528/272; 260/22 M; 260/22 CB; 260/22 R; 260/40 R; 528/303
[58] Field of Search ............ 528/272, 303; 260/22 M, 260/22 CB, 22 R

[56] References Cited

U.S. PATENT DOCUMENTS 2,035,528   3/1936   Brubaker .................... 528/272

2,944,991   7/1960   Hart ........................... 260/22 M
3,903,343   9/1975   Pfaff ............................... 428/431
4,038,340   7/1977   Frank et al. ..................... 528/303
4,094,835   6/1978   Omori et al. ................. 260/22 CA Primary Examiner—Edward M. Woodberry
Attorney, Agent, or Firm—Hubbell, Cohen, Stiefel & Gross

[57] ABSTRACT

Unsaturated polyester resins, not inhibited by atmospheric oxygen and not exhibiting persistent residual surface tackiness are disclosed. These polyester resins contain at least one compound, the melting point whereof is higher than 30° C., which has the formula R—X—OH, wherein R is an aliphatic or cycloaliphatic, saturated or unsaturated radical having 11–46 carbon atoms and X is a

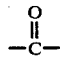

or —CHR′, wherein R′ is hydrogen, an aliphatic or cycloaliphatic radical.

13 Claims, No Drawings

UNSATURATED POLYESTER RESINS CONTAINING AN ADDITIVE OF THE FORMULA R—OH WHICH ARE NOT INHIBITED BY THE OXYGEN OF THE AIR AND PROCESS FOR MAKING THE SAME

BACKGROUND OF THE INVENTION

The present invention refers to unsaturated polyester resins which are not inhibited by the oxygen of the air, and which do not exhibit persistent residual surface tackiness, containing a particular type of additive which will be specified hereinafter. Further, the present invention refers to a process for the preparation of said unsaturated polyester resins. Other objects will be specified hereinafter.

It is known that in the hardening of unsaturated polyester resins, atmospheric oxygen has an inhibiting effect on the cross-linking which occurs through a radicalic mechanism. Said phenomenon is more or less marked depending on the type of resin. For many unsaturated polyester resins, it causes a residual tackiness to remain on the surface exposed to the air, which tackiness persists even after many months. The tackiness is all the more accentuated the smaller the thickness of the resin body. This is harmful particularly in the use of unsaturated polyester resins (glass fibre reinforced polyesters), as the tackiness of the products causes difficulty in stacking the products, adhesion of powder on the surface, of the products, and other drawbacks.

In order to avoid said drawbacks it is known to employ solid paraffins at room temperature as additives to unsaturated polyesters. The paraffins, however, decrease the adhesion between the resin layers to an extent that they will separate, particularly under fatigue stresses.

SUMMARY OF THE INVENTION

The Applicant has now surprisingly found that the addition of a particular type of compounds to unsaturated polyester resins prevent inhibition by atmospheric oxygen, whereby the resins do not exhibit surface tackiness after hardening and do not have the aforesaid further drawbacks.

An object of the present invention is therefore constituted by unsaturated polyester resins which are not inhibited by atmospheric oxygen and which do not exhibit persistent residual surface tackiness, characterized by the fact that they contain at least one compound having the formula (1)

R—X—OH (1)

wherein
R represents an aliphatic or cycloaliphatic, saturated or unsaturated, radical containing from 11 to 46 carbon atoms, optionally substituted, and
X represents a

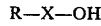

or —CHR'—rest wherein R' is hydrogen, an aliphatic or cycloaliphatic radical, said compound having a melting point higher than 30° C. and preferably comprised between 40° and 140° C.

The compound having the formula (1) has both an hydrophilic nature (due to the XOH group) and a lipophilic nature (due to the long aliphatic hydrocarbon chain).

The polyester resins containing the aforesaid compound do not have the drawback of an inadequate adhesion between the layers, in glass fibre reinforced products made therefrom.

Preferably, the compounds having the formula (1) are present in the unsaturated polyester resins in amounts comprised between 0.01 and 10% by weight, preferably between 0.1 and 8% by weight, and more preferably between 0.2 and 5% by weight, with respect to the resin.

As compounds having the formula (1) there may be employed, by way of example but not exclusively;
if X is

stearic, palmitic, lauric, myristic, arachidic behenic lignoceric alcohols etc.;
if X is —CHR'—, cetylic, stearylic, pentadecylic acids, dicaprylcarbinol, diundecylcarbinol, etc.

A further object of the present invention is a process for the preparation of unsaturated polyester resins which are not inhibited by atmospheric oxygen and do not exhibit persistent residual surface tackiness after hardening in the presence of radicalic initiators, characterized by the fact that at least a compound having the formula (1) is added, at a temperature comprised between 10° and 180° C., to the alkyd before the addition of the unsaturated monomer.

Another object of the present invention is a process for the preparation of unsaturated polyester resins which are not inhibited by atmospheric oxygen and do not show persistent residual surface tackiness, characterized by the fact that at least a compound of formula (1) is added, at a temperature comprised between 0° and 180° C., directly in the resin composition including the unsaturated monomer.

DESCRIPTION OF THE PREFERRED EMBODIMENT

In carrying out either process according to the invention, the amount of the compound having the formula (1) is preferably, as hereinbefore indicated, from 0.1 to 8%, more preferably from 0.2 to 5% with respect to the unsaturated polyester resin.

Examples of unsaturated polyester resins which may be employed according to the invention are those obtained by reaction of the usual bicarboxylic acids or anhydrides with the usual glycols and the subsequent addition of the unsaturated monomers commonly used for this purpose.

As Examples of the acid component, fumaric acid, isophthalic acid, adipic acid, azelaic acid, phthalic anhydride, maleic anhydride, tetrahydrophthalic anhydride may be cited; as Examples of the glycol component, ethylene glycol, propylene glycol, diethylene glycol, dipropylene glycol, polyoxyethylene glycols, polyoxypropylene glycols, butanediol, pentanediol, hexanediol, may be cited.

As unsaturated monomer, the usual vinyl or allyl monomers, such as e.g. styrene, vinyltoluene, alphamethylstyrene, divinylbenzene, diallylphthalate etc. may be employed.

The reaction conditions as well as the ratios of the various reaction components are those conventionally employed.

The polymerization inhibitors too are those commonly employed, viz. hydroquinone, benzoquinone, methylhydroquinone, tertiary-butylhydroquinone.

A further object of the present invention is the use of the unsaturated polyester resins containing at least a compound of formula (1) according to the invention, in the reinforced resins, in particular the glass fibre reinforced polyester resins art as well as in the non-reinforced resins art, in particular in the manufacture of buttons.

The following Examples are illustrative and not limitative. The parts and percentages, unless otherwise indicated are by weight.

EXAMPLE 1

An unsaturated polyester resin constituted by
1170 parts of maleic anhydride,
450 parts of phthalic anhydride,
450 parts of propylene glycol and
1200 parts of dipropylene glycol
is prepared under stirring. The reaction is carried out in an inert gas atmosphere at 200° C.

The reaction is stopped by cooling the mixture when an acid number of 45 mg KOH/g of resin is reached. 0.64 parts of hydroquinone are added at 160° C., always under stirring.

Thereafter 43 parts of palmytic acid are added at 120° C., and finally 1285 parts of styrene are added at 110° C. A resin is thus obtained having viscosity of 500 cps at 25° C., which, when hardened by means of a peroxide according to known methods, is free from surface tackiness.

EXAMPLE 2

One part of unsaturated polyester resin prepared as described in Example 1, obtained from
88 parts of maleic anhydride,
15 parts of phthalic anhydride
and
106 parts of diethylene glycol
and containing
82 parts of styrene
and
0.03 parts of hydroquinone, is employed.
5 parts of stearic acid
and
5 parts of cetyl alcohol are added under stirring to the resin not yet hardened and maintained at 25° C., and the mixture is heated, always under stirring, to 70° C. until dissolution occurs.

A resin is thus obtained having a viscosity of 500 cps at 25° C., which, when hardened by means of a radicalic initiator according to known methods, does not have surface tackiness.

EXAMPLE 3

2000 parts of unsaturated polyester resin, prepared under the conditions indicated in Example 1, from
1170 parts of maleic anhydride,
450 parts of phthalic anhydride
and
2010 parts of dipropylene glycol
and containing
0.97 parts of hydroquinone
and
1450 parts of styrene, is used.
40 parts of cetyl alcohol are added to the resin under stirring and the mixture is heated to 60° until dissolution occurs.

A resin is thus obtained having a viscosity of 500 cps at 25° C., which, when hardened according to known methods, is free from surface tackiness.

EXAMPLE 4

A laminate, constituted by
70 parts of chopped strand 450 mat (4 layers)
and
160 parts of polyester resin, prepared as in Example 3
and catalyzed with
0.95 parts by volume of 6% cobalt octoate
and
1.6 parts by volume of 50% methylethylketone peroxide, is prepared in the usual way.

After 1.5 hours the surface tackiness of the product disappears.

EXAMPLE 5

A laminate, constituted by 70 parts of chopped strand 450 mat (4 layers) and
160 parts of polyester resin prepared as in Example 3 but free from cetyl alcohol
and catalyzed with
0.95 parts by volume of 6% cobalt octoate
and
1.6 parts by volume of 50% methylethylketone peroxide, is prepared in the usual way.

The surface was still tacky after 10 days.

EXAMPLE 6

Four 20 cm×20 cm×0.3 cm laminates, constituted by 30% of chopped strand 450 mat (4 layers) and 70% of polyester resin obtained as described in Example 3, catalyzed with 0.6% of 6% cobalt octoate and 0.5% of 50% methylethylketone peroxide, are prepared in the usual way.

The first two laminates are prepared from the resin obtained in Example 3, but without adding cetyl alcohol to the resin, and the other two from the cetyl alcohol containing resin described in Example 3.

The first two test pieces containing cetyl alcohol are overlaid to one another in such a way that the contact surface is 50 cm² (2.5 cm×20 cm) and are glued with a resin obtained according to Example 3 but without cetyl alcohol, catalyzed with 0.6% of 6% cobalt octoate and 0.5% of 50% methylethylketone peroxide.

The two glued plates are subjected to an uniform load of 20 kg until hardening.

The same is done with the plates prepared from the cetyl alcohol containing resin. The glueing in such case is effected with the resin prepared in Example 3, containing the cetyl alcohol.

From the two products thus obtained 20 cm×2.5 cm test pieces are prepared with the long side perpendicular to the main dimension of the glued surface.

The pieces thus obtained are loaded to traction with an "INSTRON 1195" dynamometer. In this way an average breaking load of 72 kg/cm² is obtained. Both the test pieces containing cetyl alcohol and the test pieces not containing cetyl alcohol are found to have an average breaking load of 72 kg/cm².

We claim:

1. A composition which is not inhibited by atmospheric oxygen and does not exhibit persistent residual surface tackiness, comprising an unsaturated polyester resin physically admixed with at least one compound having the formula (1)

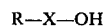 (1)

wherein R represents an aliphatic or cycloaliphatic, saturated or unsaturated radical, containing from 11 to 46 carbon atoms, and X represents a

wherein R' is hydrogen, an aliphatic or cycloaliphatic radical, said compound having a melting point higher than 30° C.

2. The compositions according to claim 1, wherein the compound having the formula (1) has a melting point from 40 to 140° C.

3. The compositions according to claim 1, wherein the overall amount of the compounds having the formula (1), is from 0.01 to 10% by weight with respect to the resin.

4. The composition according to claim 3, wherein the overall amount of the compounds having the formula (1) is from 0.2 to 5% by weight with respect to the resin.

5. The composition according to claim 1, wherein palmitic acid or stearic acid is employed as the compound having the formula (1).

6. The composition according to claim 1, wherein cetyl alcohol is employed as the compound having the formula (1).

7. The composition according to claim 1, wherein said polyester resin is obtained from maleic anhydride, phthalic anhydride, propylene glycol, dipropylene glycol and styrene, and the compound of formula (1) is palmitic acid.

8. The composition of claim 1, wherein the unsaturated polyester resin is obtained from maleic anhydride, phthalic anhydride, diethylene glycol and styrene, and physically admixed with a mixture of stearic acid and cetyl alcohol as compounds having the formula (1).

9. The composition of claim 1, wherein the unsaturated polyester resin is obtained from maleic anhydride, phthalic anhydride, dipropylene glycol and styrene, and physically admixed with cetyl alcohol as compounds having the formula (1).

10. Process for the preparation of unsaturated polyester resins comprising adding at least one compound having the formula (1)

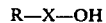 (1)

wherein R represents an aliphatic or cycloaliphatic, saturated or unsaturated radical, containing from 11 to 46 carbon atoms, and X represents a

wherein R' is hydrogen, an aliphatic or cycloaliphatic radical, said compound having a melting point higher than 30° C. is added at a temperature from 10° to 180° C. to the alkyd before adding the unsaturated monomer.

11. Process for the preparation of unsaturated polyester resins comprising adding at least one compound having the formula (1)

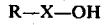 (1)

wherein R represents an aliphatic or cycloaliphatic, saturated or unsaturated radical, containing from 11 to 46 carbon atoms, and X represents a

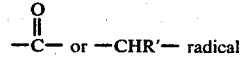

wherein R' is hydrogen, an aliphatic or cycloaliphatic radical, said compound having a melting point higher than 30° C. is added at a temperature from 0 and 180° C. directly to the resin composition including the unsaturated monomer.

12. A process for making reinforced resin products comprising mixing an unsaturated polyester resin which has been physically admixed with at least one compound having the formula (1)

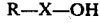 (1)

wherein R represents an aliphatic or cycloaliphatic, saturated or unsaturated radical, containing from 11 to 46 carbon atoms, and X represents a

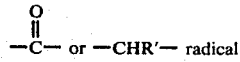

wherein R' is hydrogen, an aliphatic or cycloaliphatic radical, said compound having a melting point higher than 30° C. with a reinforcing agent to form a reinforced polyester.

13. The process of claim 12, wherein the reinforcing agent is fiber glass.

* * * * *

UNITED STATES PATENT OFFICE
CERTIFICATE OF CORRECTION

Patent No. 4,250,295     Dated February 10, 1981

Inventor(s) Corrado, et al.

It is certified that error appears in the above-identified patent and that said Letters Patent are hereby corrected as shown below:

Column 2, line 27: "lignoceric alcohols" should read --lignoceric acids--.

Column 2, line 29: "acids" should read --alcohols--.

Signed and Sealed this

Sixteenth Day of February 1982

[SEAL]

Attest:

Attesting Officer

GERALD J. MOSSINGHOFF

Commissioner of Patents and Trademarks